(No Model.)　　　　　　　　　　　　　　　6 Sheets—Sheet 1.
H. B. A. KEISER.
METHOD OF FOUNDING.

No. 514,473.　　　　　　　　　Patented Feb. 13, 1894.

WITNESSES　　　　　　　　　　　　　　INVENTOR
　　　　　　　　　　　　　　　　　　　Henry B. A. Keiser
　　　　　　　　　　　　　　　　　　　by Bakewell & Sons
　　　　　　　　　　　　　　　　　　　his attorneys (No Model.) 6 Sheets—Sheet 4.

H. B. A. KEISER.
METHOD OF FOUNDING.

No. 514,473. Patented Feb. 13, 1894.

WITNESSES INVENTOR

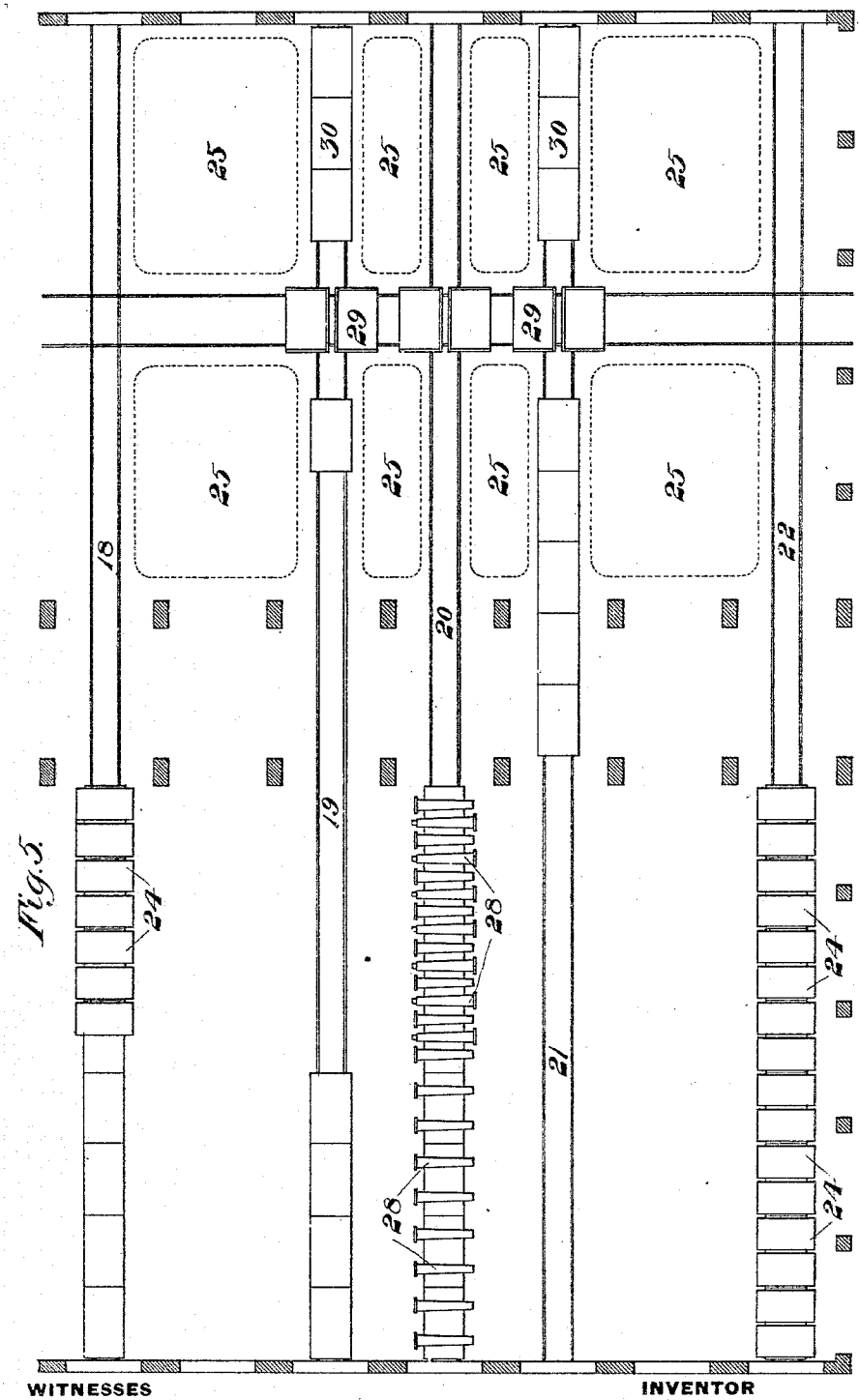

(No Model.) 6 Sheets—Sheet 6.
H. B. A. KEISER.
METHOD OF FOUNDING.
No. 514,473. Patented Feb. 13, 1894.
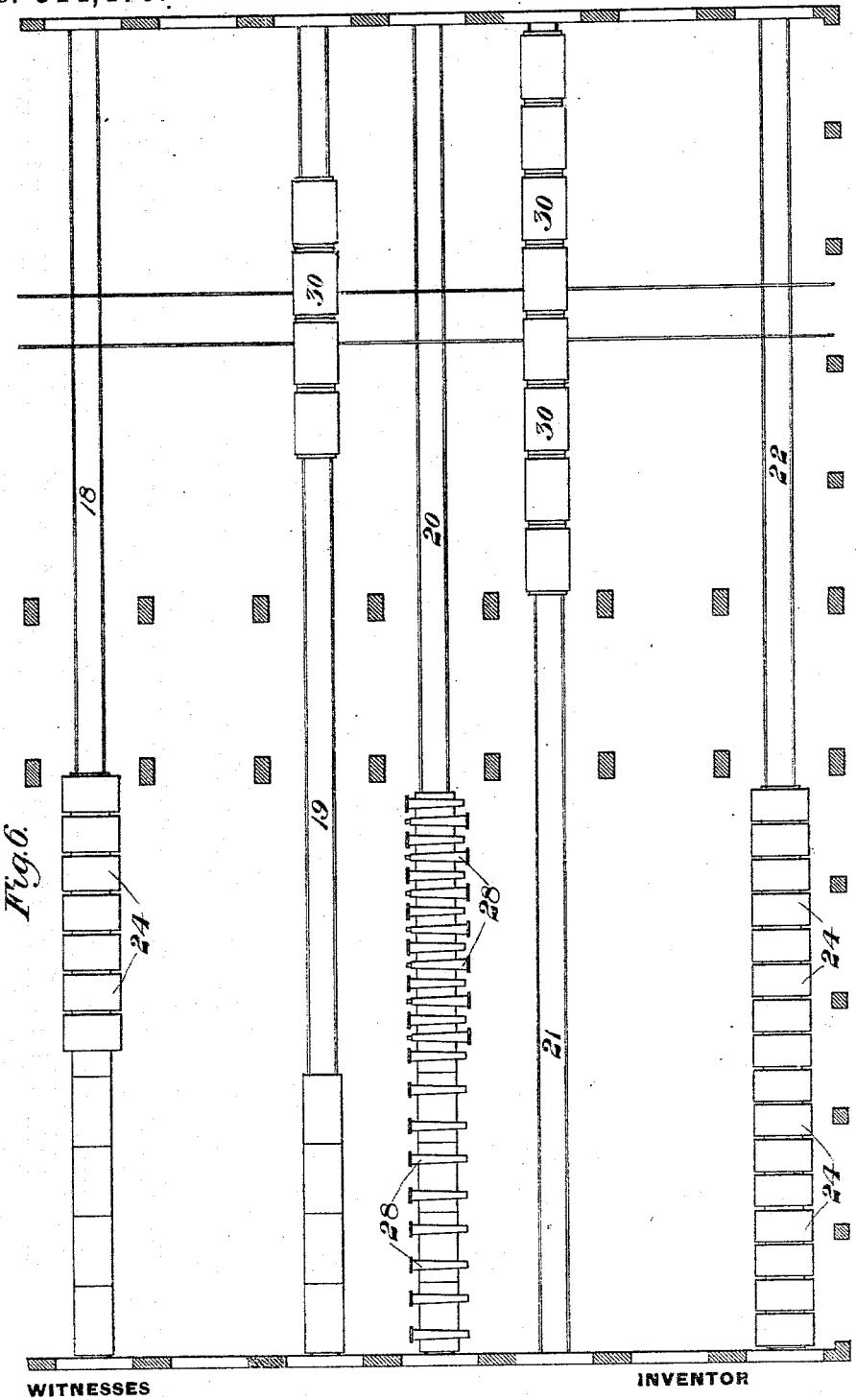
WITNESSES INVENTOR

UNITED STATES PATENT OFFICE.

HENRY B. A. KEISER, OF BRADDOCK, PENNSYLVANIA.

METHOD OF FOUNDING.

SPECIFICATION forming part of Letters Patent No. 514,473, dated February 13, 1894.

Application filed June 16, 1893. Serial No. 477,824. (No specimens.)

*To all whom it may concern:*

Be it known that I, HENRY B. A. KEISER, of Braddock, in the county of Allegheny and State of Pennsylvania, have invented a new and useful Improvement in Methods of Founding, of which the following is a full, clear, and exact description, reference being had to the accompanying drawings, forming part of this specification, in which—

Figure 1:
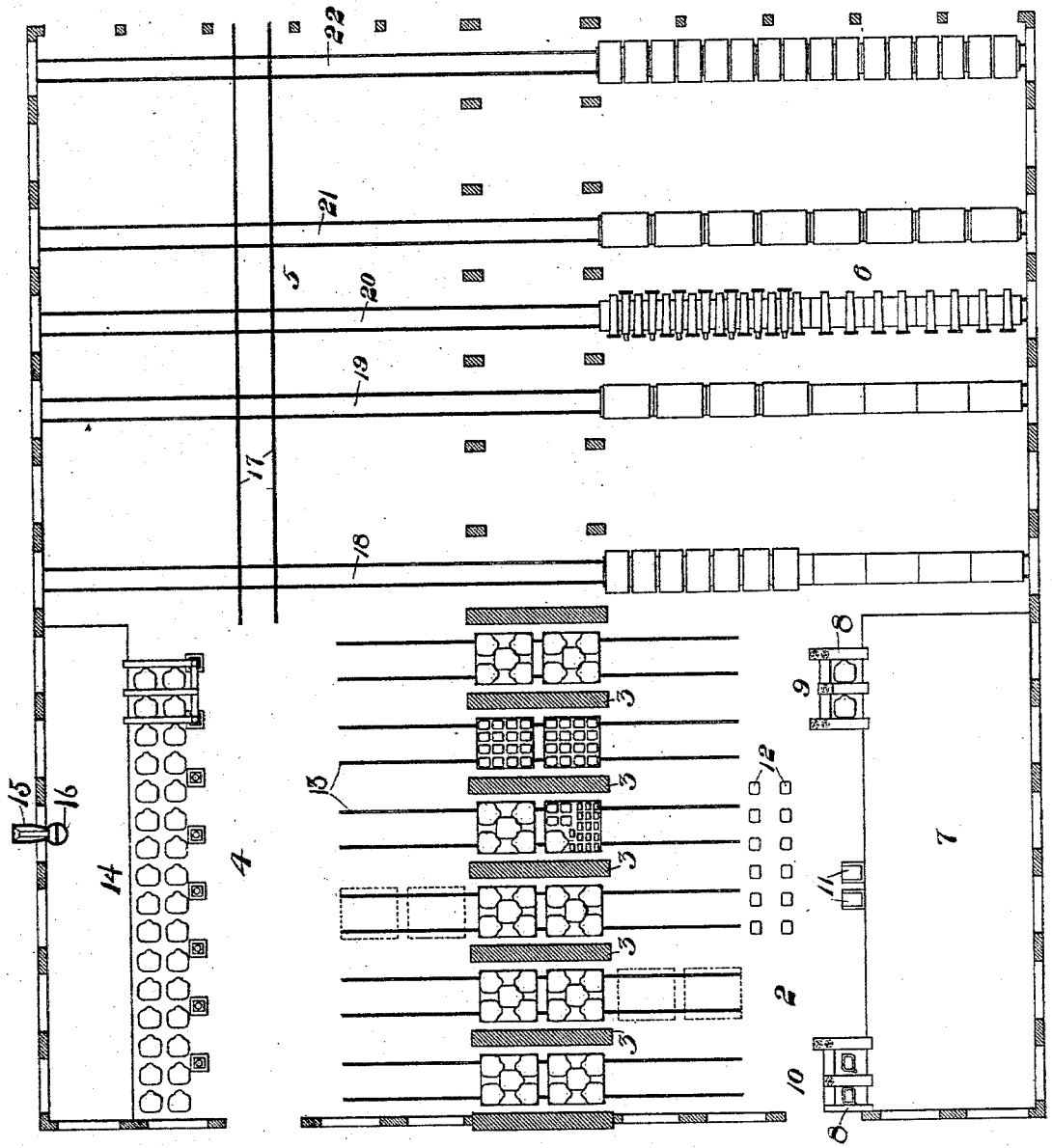

Figure 1 is a general plan view of a casting-plant arranged in accordance with my invention; and Figs. 2—6, inclusive, are plan views of the cleaning and storage departments, showing the successive steps of my improved method.

My invention relates to the manufacture of castings, and is designed to greatly simplify and cheapen their manufacture, by systematizing the steps of casting, stripping, assorting, &c. Heretofore, the molds have ordinarily been stripped at the point where they were poured, and the molds, cores, castings, &c., became mixed together, leading to much confusion and loss of time. My invention does away with this difficulty by arranging the steps in a certain order or rotation and at fixed places relatively to each other, as hereinafter more fully described and set forth in the claims.

In the drawings, 2 indicates the molding department, 3 the drying ovens, 4 the casting department, 5 the cleaning department, and 6 the storing department. A suitable raised bank or wharf 7 is provided for the molders' use, with which stagings 8 are provided to support the operator in tamping, &c.

9 represents the molding stand, 10 the core-making stand, 11 the blacking stand, and 12 a series of cores ready to be blackened. From the molding department, a series of tracks 13 lead to the casting department, passing through the drying ovens 3.

14 represents the casting-stand, which is a raised bank or wharf, 15 being the runner from the cupola, and 16 the ladle. From the casting-department, a track 17 leads transversely through the cleaning and stripping department 5; and passing longitudinally through both the cleaning and the storing departments, are five tracks 18, 19, 20, 21 and 22. The track 17 is preferably a standard gage track, while the other five are narrow gage tracks.

The various departments are provided with suitable overhead traveling cranes or carriers, by which molds, flasks, &c., may be transferred.

Figure 2:
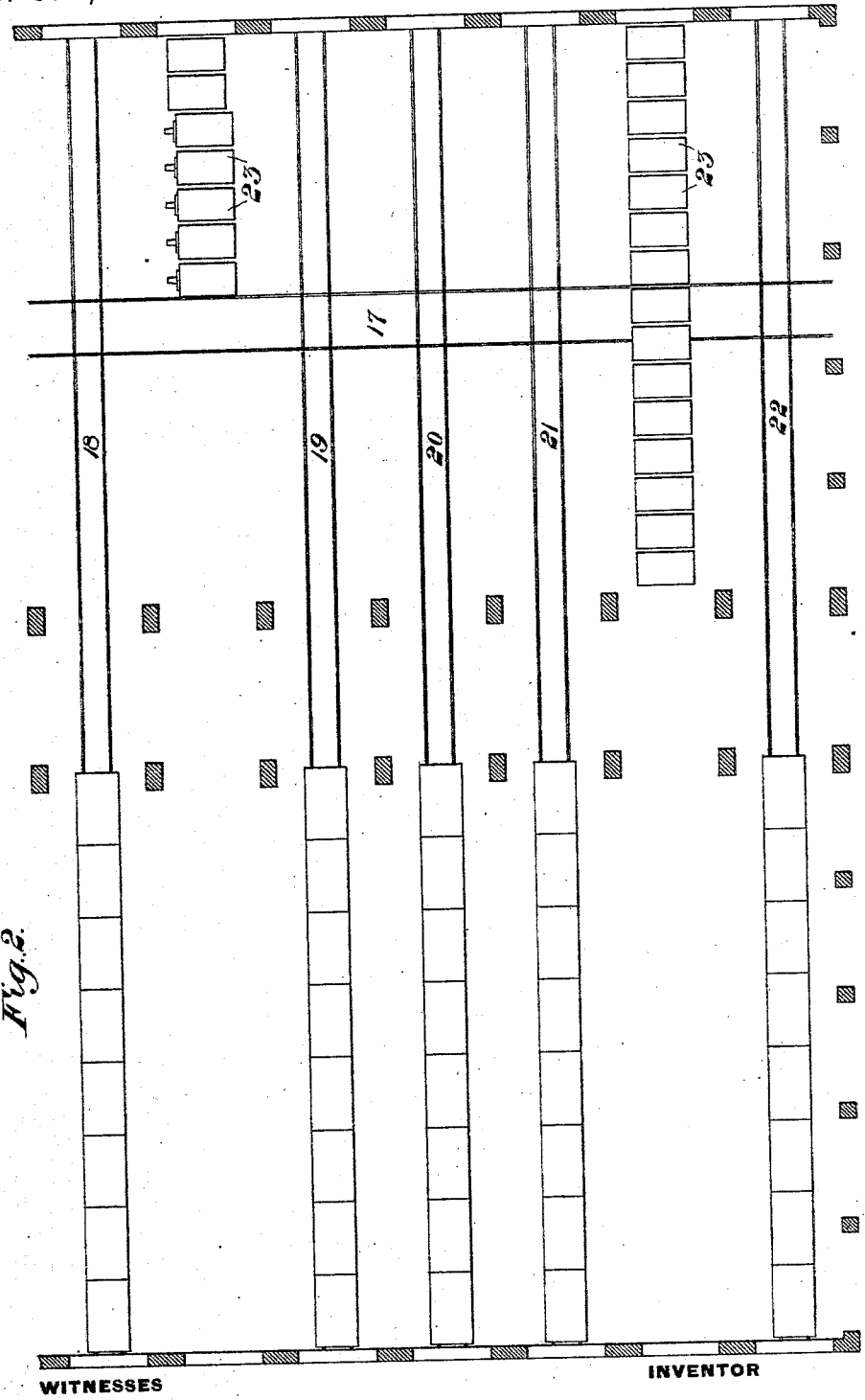
Figure 3:
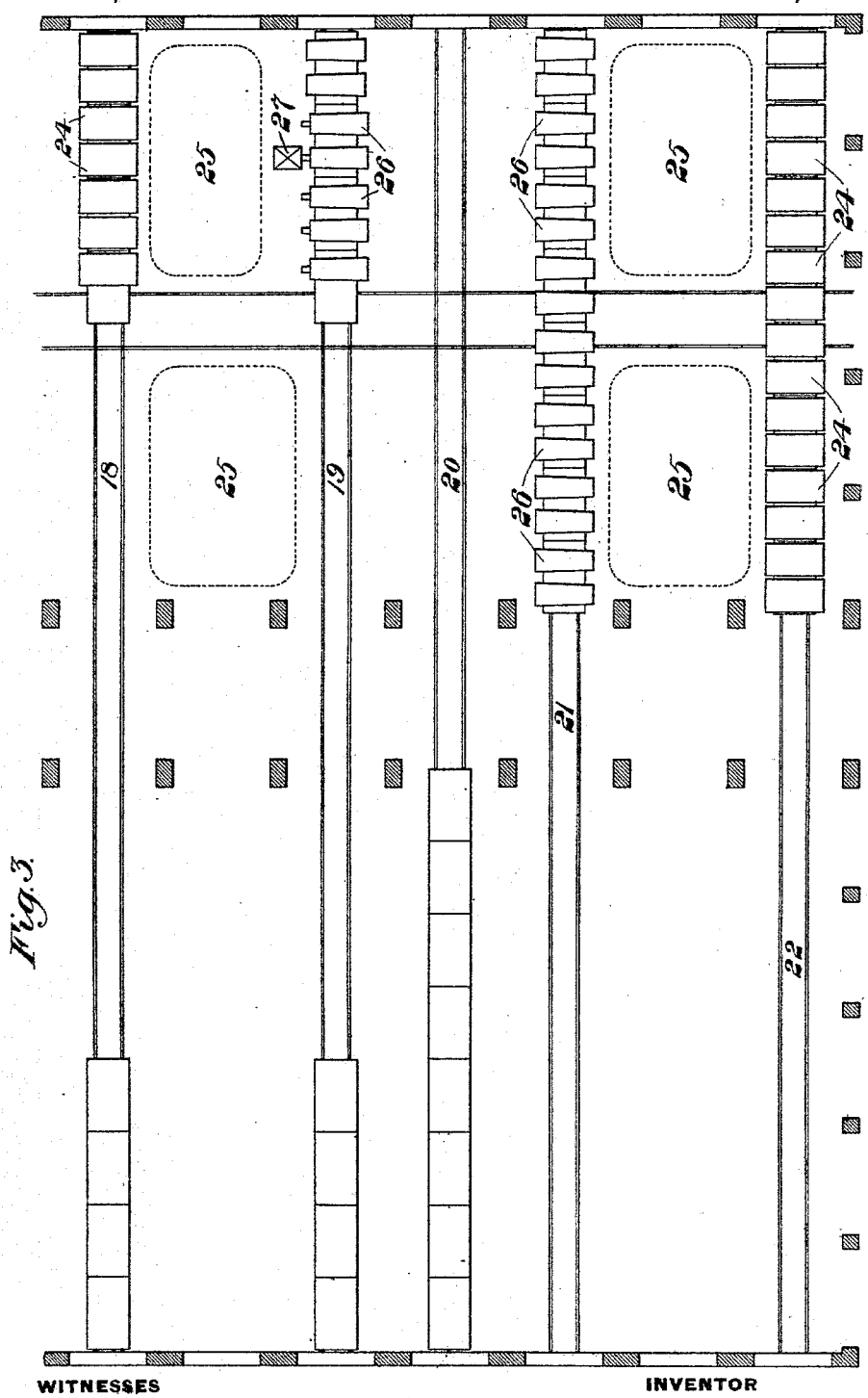
Figure 4:
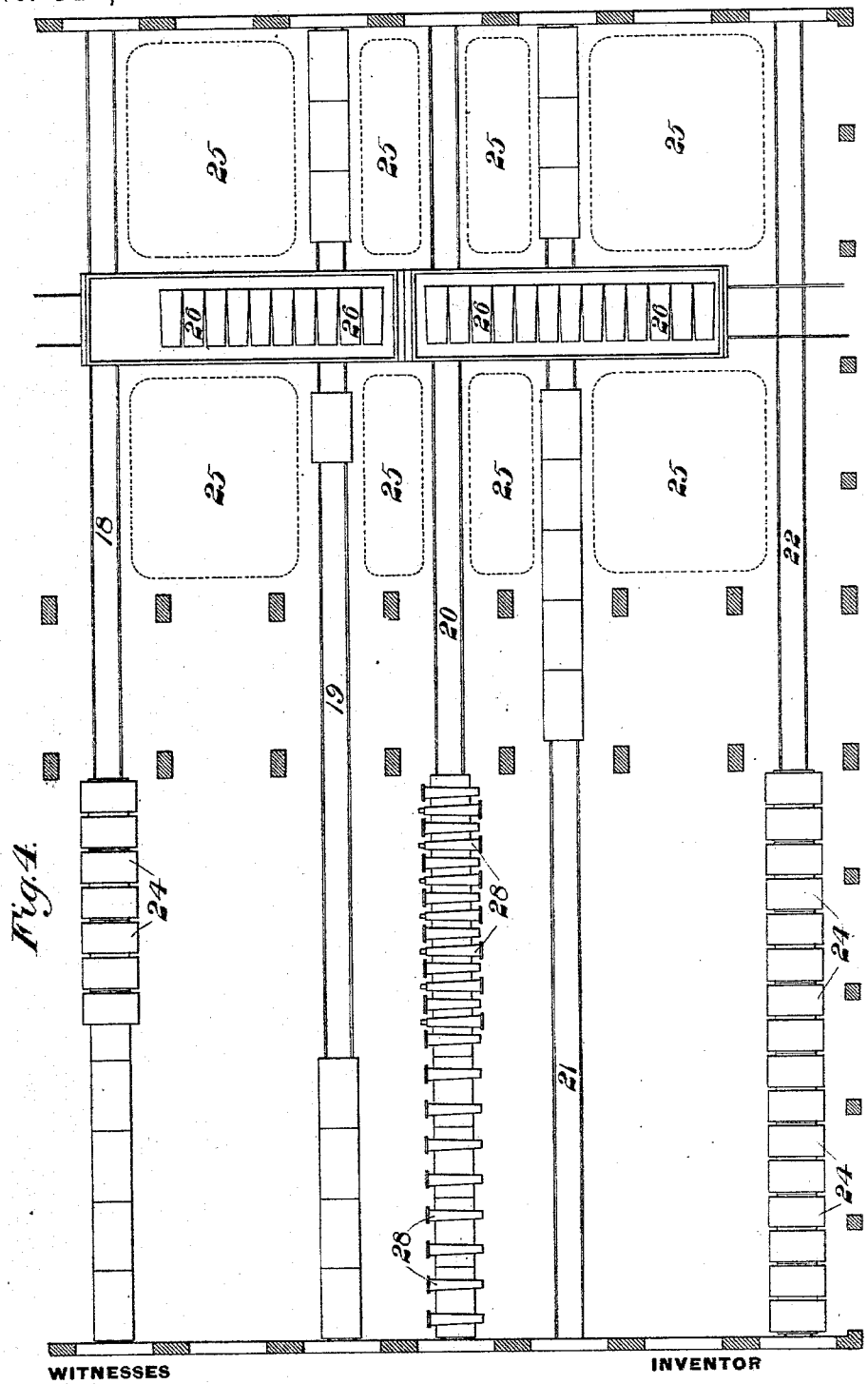

I will now describe the steps of my improved process in connection with Figs. 2—6 inclusive, which illustrate the stripping and storing rooms. The molds having been poured, the filled molds 23, which I term the "cast," are laid in series between the tracks 18 and 19 and the tracks 21 and 22, as shown in Fig. 2. When the metal is cooled sufficiently, the flasks 24 are removed and laid upon cars movable upon the two outer tracks 18 and 22, the sand falling into heaps 25 between the tracks. The castings 26, with cores therein, are laid upon cars moving upon the tracks 19 and 21, and while thereon their cores are ejected by suitable core-pushers, one of which is indicated at 27. The core-barrels 28 thus pushed out of the castings into the space between the track 20 and the tracks 19 and 21, are then placed upon cars moving upon the track 20, and the castings 26 are cleaned. The flasks and core-barrels are then moved on the cars into the storage room and taken to the molding and core-making rooms, and the finished castings 26 are loaded upon standard gondola cars upon the transverse track 17, whence they are taken out to the point desired, as shown in Fig. 4. The sand 25 forms in heaps between the tracks, and that which is burned by the castings is separated from the uninjured portion, and new sand is brought in from outside upon the cars 29, of Fig. 5, and mixed therewith. The mixed and prepared sand is then loaded upon sand cars 30 upon the tracks 19 and 21, these cars having removable hoppers or sand boxes which may be carried by a bail hung upon a crane and tipped to drop the sand at any desired point. The cars 29 being removed, the cars 30, with the sand thereon, are then run into the storing room and used as desired, (see Fig. 6.)

The advantages of my invention will be apparent to those skilled in the art, since the various operations are all performed separately and without interfering with each other, the parts are all kept apart, and no confusion can occur.

Variations in the form and arrangement of the parts may be made by those skilled in the art without departure from my invention, since

What I claim is—

1. The method of founding consisting in moving filled sand molds from the casting department to a cleaning department, laying them at a suitable point adjacent to a carrier, stripping off the flasks at such point, carrying away the flasks on one side of the sand, lifting the castings to elevated platforms upon the other side of the sand, and ejecting the core barrels from the castings while upon such platforms; substantially as described.

2. The method of founding consisting in moving filled sand molds from the casting department to a cleaning department, laying them at a suitable point between carriers, stripping off the flasks and depositing the sand at such point, carrying away the flasks on one side of the sand, placing the castings upon carriers movable upon the other side of the sand, and ejecting the core barrels from the castings while upon the carriers; substantially as described.

3. The method of founding consisting in moving filled sand molds from the casting department to a cleaning department, laying them at a suitable point between carriers, stripping off the flasks and depositing the sand at such point, carrying away the flasks on one side of the sand, placing the castings upon carriers movable upon the other side of the sand, ejecting the core barrels from the castings while upon the carriers, and removing the same to be returned to the molding department; substantially as described.

4. The method of founding consisting in moving filled sand molds from the casting department to a cleaning department, laying them at a suitable point between carriers, stripping off the flasks and depositing the sand at such point, carrying away the flasks on one side of the sand, placing the castings upon carriers movable upon the other side of the sand, ejecting the core barrels from the castings while upon the carriers, and removing the cleaned castings in a transverse direction to the movement of the flasks; substantially as described.

5. The method of founding consisting in moving filled sand molds from the casting department to a cleaning department, laying them at a suitable point between carriers, stripping off the flasks and depositing the sand at such point, carrying away the flasks on one side of the sand, placing the castings upon carriers movable upon the other side of the sand, ejecting the core barrels from the castings while upon the carriers, removing the cleaned castings in a transverse direction to the movement of the flasks, and then moving the sand in the same direction as the flasks; substantially as described.

6. A casting plant having a molding department, a casting department, and a cleaning and storage department extending alongside the molding and casting departments, a track leading from the casting department transversely across the cleaning department, longitudinal tracks passing through the cleaning and storage department, and core pushers located beside a longitudinal track; substantially as described.

In testimony whereof I have hereunto set my hand.

HENRY B. A. KEISER.

Witnesses:
  W. P. POTTER,
  H. M. CORWIN.